US010357413B2

(12) United States Patent
Buerstner et al.

(10) Patent No.: US 10,357,413 B2
(45) Date of Patent: Jul. 23, 2019

(54) OPERATING TABLE AND METHOD FOR CONTROLLING AN OPERATING TABLE

(71) Applicant: MAQUET GMBH, Rastatt (DE)

(72) Inventors: Markus Buerstner, Karlsruhe (DE); Michael Frueh, Achern (DE)

(73) Assignee: MAQUET GMBH, Rastatt (DE)

( * ) Notice: Subject to any disclaimer, the term of this patent is extended or adjusted under 35 U.S.C. 154(b) by 210 days.

(21) Appl. No.: 14/785,032

(22) PCT Filed: Apr. 30, 2014

(86) PCT No.: PCT/EP2014/058836
§ 371 (c)(1),
(2) Date: Oct. 16, 2015

(87) PCT Pub. No.: WO2014/177619
PCT Pub. Date: Nov. 6, 2014

(65) Prior Publication Data

US 2016/0089287 A1 Mar. 31, 2016

(30) Foreign Application Priority Data

May 3, 2013 (DE) ........................ 10 2013 104 538

(51) Int. Cl.
*A61G 7/018* (2006.01)
*A61G 7/05* (2006.01)
(Continued)

(52) U.S. Cl.
CPC ............ *A61G 7/015* (2013.01); *A47C 31/008* (2013.01); *A61G 13/08* (2013.01); *A61G 13/104* (2013.01);
(Continued)

(58) Field of Classification Search
CPC ...... A61G 7/015; A61G 7/018; A61G 7/0573; A61G 13/02; A61G 13/04; A61G 13/06;
(Continued)

(56) References Cited

U.S. PATENT DOCUMENTS 5,838,223 A * 11/1998 Gallant .................. A61G 12/00 340/286.06
5,926,002 A * 7/1999 Cavanaugh .......... A47C 31/008 297/284.3
(Continued)

FOREIGN PATENT DOCUMENTS

CN 1973801 A 6/2007
CN 101011311 A 8/2007
(Continued)

OTHER PUBLICATIONS

Chinese Search Report dated Aug. 15, 2016 which issued for corresponding Chinese Patent Application No. 201480033717.4, 2 pages.
(Continued)

*Primary Examiner* — Eric J Kurilla
*Assistant Examiner* — Rahib T Zaman

(57) ABSTRACT

An operating table and a method for an operating table are disclosed. The operating table has an adjustable component, a drive device that adjusts the adjustable component, and a first sensor that detects a position of the adjustable component. The operating table also has a second sensor that detects the position of the adjustable component and a controller that controls the drive device. The controller operates in a first operating mode and a second operating mode. In the first operating mode of the controller, the first sensor is activated and the drive device is energized. In the second operating mode of the controller, the second sensor is activated and the drive device is de-energized The controller changes from the second operating mode to the first
(Continued)

operating mode when the second sensor detects a change of the position of the adjustable component.

23 Claims, 3 Drawing Sheets

(51) Int. Cl.

| | |
|---|---|
| ***A47B 7/02*** | (2006.01) |
| ***A61G 7/10*** | (2006.01) |
| ***A61G 13/06*** | (2006.01) |
| ***G06F 17/00*** | (2019.01) |
| ***G05B 15/02*** | (2006.01) |
| ***G05B 11/14*** | (2006.01) |
| ***A61G 7/015*** | (2006.01) |
| ***A61G 13/08*** | (2006.01) |
| ***A61G 13/10*** | (2006.01) |
| ***A47C 31/00*** | (2006.01) |
| *A61G 13/04* | (2006.01) |

(52) U.S. Cl.
CPC ............ *A61G 13/105* (2013.01); *A61G 13/04* (2013.01); *A61G 13/06* (2013.01); *A61G 2203/12* (2013.01); *A61G 2203/36* (2013.01)

(58) Field of Classification Search
CPC ................ A61G 13/08; A61G 2203/12; A61G 2203/36; A61G 7/05; A61G 7/10; A47B 7/02; G06F 17/00; G05B 15/02; G05B 11/14
See application file for complete search history.

(56) References Cited

U.S. PATENT DOCUMENTS

| | | | | |
|---|---|---|---|---|
| 6,248,014 | B1 * | 6/2001 | Collier | A47B 21/00 454/186 |
| 7,027,358 | B1 * | 4/2006 | Esposito | A61B 5/447 340/573.1 |
| 2002/0138905 | A1 * | 10/2002 | Bartlett | A61G 7/001 455/420 |
| 2003/0061662 | A1 * | 4/2003 | Strobel | A61G 13/02 5/618 |
| 2003/0139177 | A1 * | 7/2003 | Doering | A61G 13/02 455/420 |
| 2003/0195644 | A1 * | 10/2003 | Borders | A47C 31/008 700/90 |
| 2004/0074003 | A1 | 4/2004 | Bannister | |
| 2005/0172405 | A1 * | 8/2005 | Menkedick | A61B 5/1115 5/618 |
| 2005/0283911 | A1 | 12/2005 | Roussy | |
| 2006/0080777 | A1 | 4/2006 | Rocher et al. | |
| 2007/0022535 | A1 * | 2/2007 | Yue | A61G 13/08 5/600 |
| 2007/0143920 | A1 * | 6/2007 | Frondorf | A61G 7/005 5/81.1 R |
| 2010/0063638 | A1 | 3/2010 | Skinner | |
| 2010/0187379 | A1 * | 7/2010 | Kragh | A47B 9/12 248/188.4 |
| 2012/0114107 | A1 | 5/2012 | Wang | |
| 2012/0138067 | A1 * | 6/2012 | Rawls-Meehan | A47C 20/041 128/845 |
| 2012/0139395 | A1 * | 6/2012 | Dietrich | A47C 3/265 310/686 |
| 2013/0076517 | A1 * | 3/2013 | Penninger | A61H 3/00 340/573.4 |
| 2013/0085609 | A1 * | 4/2013 | Barker | G05B 15/02 700/276 |
| 2013/0096701 | A1 | 4/2013 | Suorajaervi | |
| 2013/0289770 | A1 * | 10/2013 | Rawls-Meehan | G05B 15/02 700/275 |

FOREIGN PATENT DOCUMENTS

| | | | |
|---|---|---|---|
| CN | 102462487 | A | 5/2012 |
| DE | 199 55 116 | A1 | 5/2001 |
| DE | 102005053754 | A1 | 5/2007 |
| DE | 102005054223 | A1 | 5/2007 |
| DE | 102007062200 | A1 | 9/2008 |
| JP | 2004-538037 | A | 12/2004 |
| JP | 2007-190366 | A | 8/2007 |
| JP | 2011-258031 | A | 12/2011 |
| JP | 2012-081274 | A | 4/2012 |
| RU | 2468781 | C1 | 12/2012 |
| WO | WO 99/25303 | A1 | 5/1999 |
| WO | WO 02/055001 | A1 | 7/2002 |

OTHER PUBLICATIONS

International Search Report dated Aug. 12, 2014, issued in PCT/EP2014/058836 (with English translation).
Korean Office Action dated Jun. 7, 2018 which issued for corresponding Korean Patent Application No. 10-2015-7034398, 3 pages.
Russian Search Report dated Sep. 29, 2017 which issued for corresponding Russian Patent Application No. 2015151615, 2 pages.
Japanese Office Action dated Jan. 30, 2018 which issued for corresponding Japanese Patent Application No. 2016-511057, 3 pages (with 3 pages of English translation).

* cited by examiner

OPERATING TABLE AND METHOD FOR CONTROLLING AN OPERATING TABLE

CROSS REFERENCE TO RELATED APPLICATIONS

This application is a national stage filing pursuant to 35 U.S.C. § 371 of PCT/EP2014/058836, filed on Apr. 30, 2014, and claiming benefit of priority to German Patent Application No. 10 2013 104538.3 filed on May 3, 2013, all the contents of which are incorporated by reference herein.

TECHNICAL FIELD

The invention relates to an operating table having at least one component that is adjustable by an electric drive unit. The operating table has a first sensor unit for detecting the adjustment position and/or the change of the adjustment position of the component. Further, the invention relates to a method for controlling such an operating table.

BACKGROUND

Three different types of operating tables are typically used in hospitals, namely stationary operating tables, movable operating tables and mobile operating tables. Stationary operating tables have an operating table column permanently fixed to the floor of the operating room, wherein normally they do not comprise an operating table base and energy is supplied to them via fixedly installed cables.

Movable operating tables have an operating table column base which is connected to the operating table column and which has no rollers and no transport device and stands on the floor of the operating room at least during a surgical operation. The movable operating tables are liftable and movable by transport carriages. Such a system which comprises a movable operating table and a transport carriage is also referred to as a mobile operating table system, The operating table column bases of mobile operating tables have rollers for moving the operating table so that they are movable without further auxiliary devices. In the case of mobile operating tables, electric traction drives, including soft start and safety brake function, can be used in order to move the mobile operating table by the electric traction drive.

The energy supply of the movable operating tables and the mobile operating tables can be provided via accumulators which are integrated in the operating table, in the operating table column base or in the operating table column.

Both in the case of stationary operating tables and in the case of movable operating tables and mobile operating tables, components which are adjustable by an electric motor can be provided, such as an operating table column which is length-adjustable by an electric motor for height variation of a patient support surface arranged on the operating table column, an operating table column head which is adjustable about two orthogonal axes for variation of tilt and swing of the patient support surface connected to the operating table column head, and/or components of the patient support surface that can be adjusted by an electric motor.

In particular in the case of operating tables which are supplied with energy via accumulators, it is appropriate to provide energy saving functions and to deactivate sensors, actuators and control functions when for a preset amount of time no control function has been activated by an input via a control element or no otherwise-initiated control function has been activated. During long surgical operations, the position of the patient is often maintained over long periods of time so that during these periods of time an energy saving function can be activated. If through such an energy saving function sensor units are also deactivated (which themselves have a relevant energy consumption and/or via which a control unit for evaluating the sensor signals of the sensor unit has a relevant energy consumption), a problem may occur in which the adjustment position of the component changes due to an external force (for example when a defect in a further component, such as a defect in the motor brake occurs). In particular, a height-adjustable operating table column can lower itself by the weight of the patient support surface and/or of the patient. If this happens during a surgical operation, then there is the possibility that a physician may be impeded in performing the surgical operation.

From document DE 199 55 116 A1, a control unit for controlling the drives of a patient support surface is known, in which a patient support surface is removable from an operating table column and comprises components adjustable by an electric motor, said control unit comprising an energy supply, a control and a control device. The control device is integrated in a transport carriage for the transport of the operating table support surface.

From document DE 10 2007 062 200 A1, an operating table having a plurality of components adjustable by control elements is known. The state and/or the change of state of at least some of the control elements is detected by sensors, the signals generated by the sensors being fed to a processing device.

From document DE 10 2005 054 223 A1, a device for adjusting an operating table is known which has an operating table column on which an adjustable patient support surface is arranged. The device comprises a control device for inputting adjustment commands for adjusting components of the operating table. The adjustment commands can be transmitted from the control device directly to the adjustable support surface.

From document DE 10 2005 053 754 A1, a device for adjusting the patient support surface of an operating table is known, which comprises several segments that are adjustable relative to each other. At least some of the adjustable segments are connected to actuators which are controllable for adjusting the associated segments. The actuators are electric motors. The input device has a device for inputting body-part-related adjustment commands which are associated with the adjustment of the position of a body part or a body portion of a patient lying on the patient support surface.

SUMMARY OF THE DISCLOSURE

It is the object of the invention to specify an operating table and a method for controlling an operating table, by which the energy demand of the operating table during a surgical operation can be reduced.

This object is accomplished by the disclosed exemplary operating table as well as by the disclosed exemplary method for controlling an operating table.

The first sensor unit is deactivated and the second sensor unit for monitoring a change of the adjustment position of the component is activated in the second operating mode of the control unit, which may be an energy saver mode. The first sensor unit is activated in the first operating mode of the control unit. Further, in the first operating mode the drive unit for adjusting the component by a control element can be activated. The control unit changes from the first to the second operating mode when the drive unit has not been activated for a preset period of time. The control unit changes from the second to the first operating mode when the second sensor unit detects a change of the adjustment position of the component. Here, a simply constructed sensor unit can be provided as a second sensor unit which may output a binary signal when the adjustment position of the component is changed. Such a sensor unit requires no or only a little energy. The evaluation of the binary sensor signal by the control unit is also possible without a great computing expenditure so that for the second sensor unit and for the evaluation of the sensor signal of the second sensor unit no or only relatively little energy is used compared with the activation of the first sensor unit and the evaluation of the sensor signal of the first sensor unit in the first operating mode. By the second sensor unit, however, a change of the adjustment position of the component may be detected when the first sensor unit is deactivated so that suitable measures can be taken to provide for suitable operation during the surgical operation.

The second operating mode may be an energy saver mode in which the first sensor unit and/or at least some of the control functions of the control unit are deactivated. In this way it is achieved that the energy demand of the operating table during a surgical operation is reduced.

Further, the value for the preset period of time can be changed by a user by a user input via an operating unit of the control unit to a value within an admissible preset range. This operating unit can be a remote control with control elements for operating the operating table. As a result, the period of time after which the control unit changes from the first operating mode to the second operating mode can easily be varied (for example, it may be adapted to the personal wishes of a surgeon and/or to the course of a surgical operation). The preset period of time may have a value in the range from 1 second to 1 hour, for example from 10 seconds to 10 minutes. By a preset value within one of these indicated ranges, it is achieved that the sequence of the surgical operation is not affected by the change of the operating mode and that energy can be saved during the surgical operation by the change to the second operating mode.

After a change from the second operating mode to the first operating mode as a result of a detection of a change of the adjustment position of the component by the second sensor unit, the control unit remains in the first operating mode also after expiration of the preset period of time. As a result, after a change from the second operating mode to the first operating mode due to the detection of a change of the adjustment position of the component by the second sensor unit in the second operating mode, the adjustment position of the component can be detected and monitored in the first operating mode by the first sensor unit. The control unit can then control the drive unit dependent on the sensor signal of the first sensor unit such that a control and a correction of the adjustment position of the component set by the control element may take place automatically without a further user input. As a result, an undesired movement is automatically counteracted by the control unit in connection with the drive unit. When it is assumed that an error state of the operating table is detected by the second sensor unit by controlling the drive unit dependent on the sensor signal of the first control unit, a correction of the desired adjustment position of the component set via the control element is made so that a desired operation occurs during the surgical operation.

Further, the control unit may activate the step position monitoring of a stepper motor serving as a drive unit and/or the control unit may short-circuit the winding of an electric motor serving as a drive unit. As a result, an unintended change of the adjustment position of the component can be prevented or the change of the adjustment position of the component can be slowed down.

The drive unit may comprise a brake which is activated at least in the second operating mode. The brake may be activated by a spring force and deactivated by an electric drive so that the brake is activated in a de-energized state of the drive unit and prevents a rotation of an armature shaft of an electric motor of the drive unit. When this brake operates incorrectly, the second sensor unit would detect a change of the adjustment position of the component also in the second operating mode so that an unsuitable operation of the brake is easily and reliably detectable by the second sensor unit.

The component may be a height adjustment unit, a longitudinal tilt adjustment unit or a transverse tilt adjustment unit of an operating table column, and the adjustment position may relate to the height of a patient support surface connected to the operating table column, the longitudinal tilt adjustment of the patient support surface and/or the transverse tilt adjustment of the patient support surface. As a result, at least a central adjustment option of the operating table column may be monitored by the second sensor unit also in the second operating mode of the control unit. Here, the pivoting of the patient support surface, about an axis of rotation which is orthogonal to the longitudinal axis of the patient support surface or orthogonal to an axis extending parallel to the longitudinal axis of the patient support surface in the same vertical plane in which also the longitudinal axis lies may be referred to as longitudinal tilt adjustment. A pivoting of the patient support surface about its longitudinal axis or about an axis of rotation running parallel to the longitudinal axis of the patient support surface in the same vertical plane in which also the longitudinal axis lies may be referred to as transverse tilt adjustment.

The second sensor unit may comprise at least one reed switch which detects a rotation of an output shaft of an electric motor serving as a drive unit and/or the rotation of an element engaged with the output shaft. A permanent magnet may be connected to the output shaft of the electric motor or integrated therein or be connected to the element that is engaged with the output shaft or integrated therein in order to detect a change of the adjustment position of the component by a simple reed switch. For evaluation of the second sensor unit, a change of the switching state of the reed switch may be monitored. When the switching state changes, a change of the adjustment position of the component may be assumed so that in the second operating state of the control unit an unsuitable operation of the operating table or a structural unit of the operating table may be assumed. Reed switches may be robust, cost-efficient and utilize relatively little space.

The reed switch may detect a rotation of the output shaft or of the element engaged with the output shaft at least when the output shaft or the element engaged with the output shaft rotates by a predetermined angle in the range between 1 and 360°, for example in the range between 45° and 90°. In this way, by choosing a suitable gear transmission ratio already a slight change of the adjustment position of the component can be detected so that an adjustment is noticed early and suitable operation occurs.

The element engaged with the drive unit may be a structural element of a gear transmission coupled with the drive unit. As a result, the second sensor unit can easily be coupled to a structural element that drives the component and no intervention in the electric motor in which normally little space is available takes place. Further, as a result thereof, a commercial electric motor which does not have to be specifically adapted for the inventive use can be used for the drive.

A change of the operating mode from the second operating mode to the first operating mode may take place when the control element is activated. In this way, the second operating mode acting as an energy saver mode can again be exited easily so that then in the first operating mode the adjustment position of the component can actively be varied again by a user input by a user with the aid of the drive unit.

After the period of time has expired once again, the control unit may again change from the first operating mode to the second operating mode, This change from the first to the second operating mode, and from the second operating mode to the first operating mode can be repeated arbitrarily often, until a change from the second to the first operating mode has taken place as a result of the detection of a change of the adjustment position of the component by the second sensor unit.

The operating table may be a mobile operating table or a movable operating table, in which the power supply of the drive unit, the control unit, the first sensor unit and the second sensor unit is provided by an accumulator. As a result, in the case of a suitable design of the accumulator, an accumulator may not have to be recharged during long surgical operations or replaced by another accumulator. This provides for a smooth flow of the surgical operation.

A second aspect of the invention relates to a method for controlling an operating table in which at least one adjustable component of the operating table is adjusted by an electric drive unit and in which an adjustment position and/or a change of the adjustment position of the component is detected by a first sensor unit. The first sensor unit may be activated in a first operating mode of a control unit. Further, the drive unit for adjusting the component by a control element can be activated in the first operating mode.

In a second operating mode of the control unit, the first sensor unit may be deactivated. Further, the second sensor unit for monitoring an adjustment position of the component may be activated in the second operating mode. A change from the first to the second operating mode may take place when the drive unit has not been activated for a preset period of time. Further, a switch from the second to the first operating mode takes place when a change of the adjustment position of the component is detected by the second sensor unit. As a result, an energy saving operation of the operating table is possible, and suitable operation during a surgical operation may occur.

The method according to the second aspect of the invention can be developed based on the above features of the operating table, the indicated or required method steps being executed by the control unit in connection with the sensor units and the drive unit.

Further features and advantages of the invention result from the following description, which explains the invention in more detail on the basis of embodiments in connection with the enclosed Figures.

DETAILED DESCRIPTION AND INDUSTRIAL APPLICABILITY

Figure 1A:
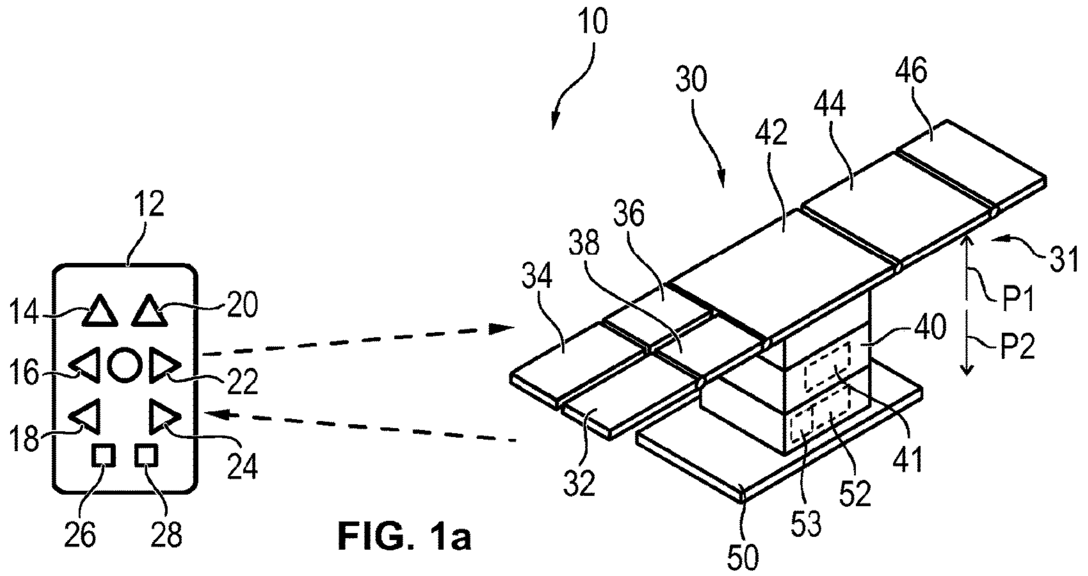
FIG. 1*a* shows an operating table with several components adjustable by control elements provided via a wireless remote control in an initial position.

FIG. 1 a shows a system 10 that may include a remote control 12 having several control elements 14 to 28 (e.g., 14, 16, 18, 20, 22, 24, 26, and 28) through which adjustable components 32 to 46 (e.g., 32, 34, 36, 38, 40, 42, 44, and 46) of an operating table 30 can be adjusted (e.g., changed in theft position in space and/or relative to other components 32 to 46). The individual components 32 to 46 or groups of these components 32 to 46 may be assigned to the control elements 14 to 28 of the remote control 12 so that when one control element 14 to 28 is actuated, a corresponding adjustment of the component 32 to 46 or component group assigned to this control element 14 to 28 is carried out by a drive unit provided for this. Exemplarily, the drive unit 41 for length adjustment of an operating table column 40 is illustrated. At the lower end of the operating table column 40, an operating table column base 50 may be provided. At the opposite end, the operating table column 40 may be connected to a patient support surface 31 comprising the components 32 to 36, 42 to 46. Based on an operation of the drive unit 41, the length of the operating table column 40 can be varied and thus the height of the patient support surface 31 above a floor, e.g. in the direction of the arrows P1 and P2 can be altered to bring a patient lying on the patient support surface 31 into a position suitable for a surgical operation to be performed.

Figure 1B:
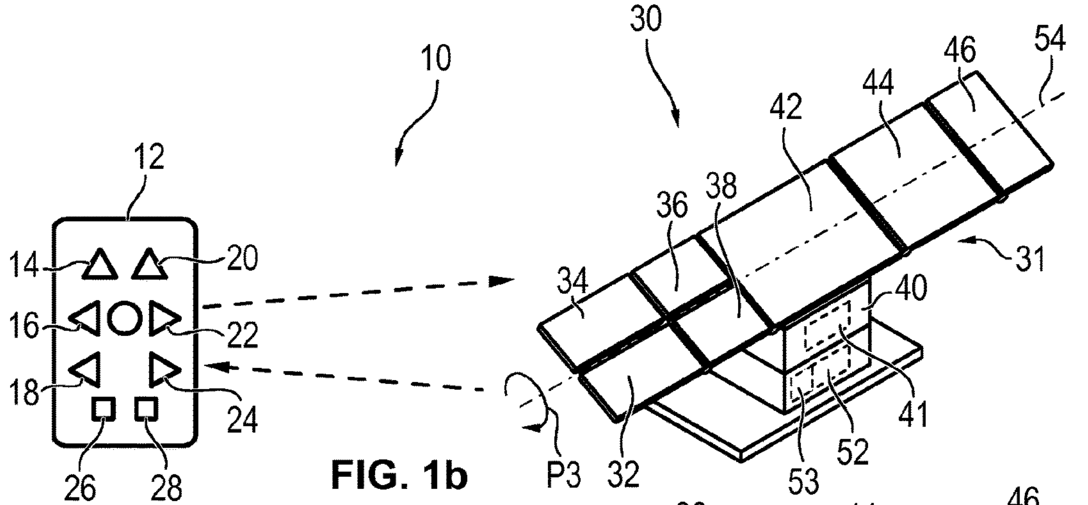
FIG. 1*b* shows the remote control and the operating table according to FIG. 1*a* after a transverse tilt adjustment starting out from the initial position according to FIG. 1*a*.
Figure 1C:
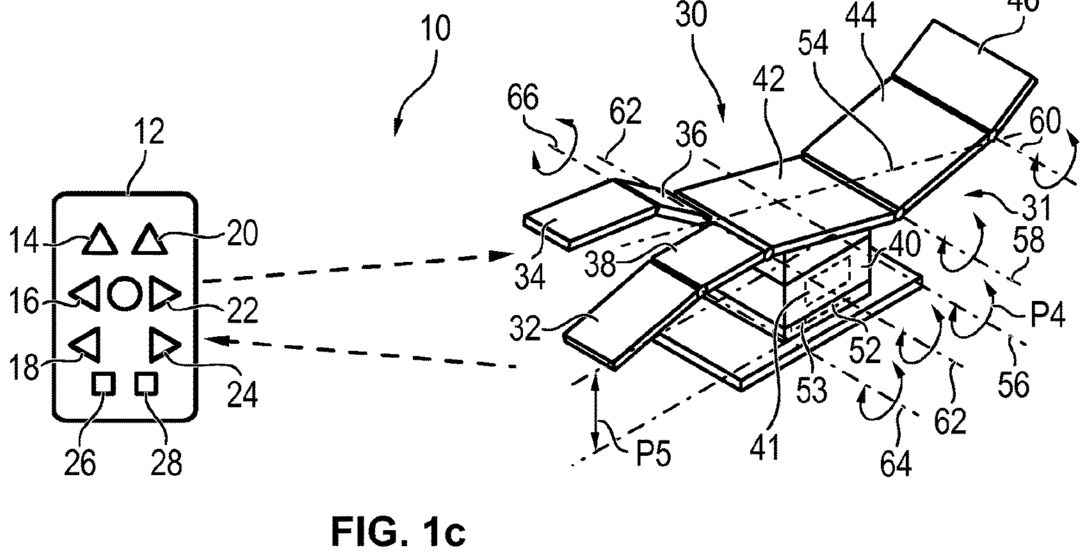
FIG. 1*c* shows the remote control and the operating table according to FIGS. 1*a* and 1*b* in a second adjustment position compared with the initial position shown in FIG. 1*a*, wherein the patient support surface is pivoted about an as of rotation running orthogonal to its longitudinal axis for longitudinal tilt adjustment and, in addition, components of the patient support surface have been pivoted about several axes of rotation relative to the center plate of the patient support surface.

The operating table 30 may comprise further drive units for changing the position of the patient support surface 31, in particular for a longitudinal tilt adjustment and/or a transverse tilt adjustment of the patient support surface 31 as well as for adjusting individual components of the patient support surface 31 relative to further components, as illustrated in particular in FIG. 1*c*. As shown in FIG. 1*b*, the patient support surface 31 may be rotated about its longitudinal axis 54 in the direction of the arrow P3 so that the patient support surface 31 may be tilted laterally. Such a lateral tilting may be referred to as transverse tilt adjustment. As can be seen on the basis of the center part 42 of the patient support surface 31 in FIG. 1*c*, the patient support surface 31 may be pivoted relative to FIG. 1*a* about an axis of rotation 56 in the direction of the arrow P4 running to the longitudinal axis 54 of the patient support surface 31 so that a longitudinal tilt adjustment of the patient support surface has been effected. Further, by an operation of the drive unit 41, the length of the operating table column 40 may be reduced and thus the patient support surface 31 may be lowered in the direction of the arrow P2, Further, the position of the back part 44 relative to the center part 42 may be changed by a rotation about the axis of rotation 58, and the position of the head part 46 relative to the back part 44 of the patient support surface 31 may be changed by a rotation about the axis of rotation 60. Also the position of the leg plates comprising the segments 34 and 36 may be changed relative to the center part 42 of the patient support surface 31 by a corresponding rotation of the segments 32 to 38 about the axes of rotation 62, 64 and 66. The reduced height of the patient support surface is indicated by the arrow P5 in FIG. 1*c*.

In a first operating mode of the control unit 52, a first sensor unit may detect the height or the change in height of the patient support surface 31 or the length of the operating table column 40 or a change of the length of the operating table column 40, wherein to evaluate the sensor signals of this first sensor unit by the control unit 52, control functions with a relatively high energy demand may be activated. The energy supply of the control unit 52 and of the first sensor unit as well as of the drive units 41 for adjusting the components may be provided via an accumulator 53 arranged in the operating table column 40. If, for example during a preset period of time, the drive unit 41 is not activated by an actuation of the control elements 14 to 28 of the remote control 12, then the control unit 52 may change from the first operating mode to the second operating mode which serves as an energy saver mode and in which the drive unit 41 and the first sensor unit are deactivated. The first sensor unit is also referred to as position sensor unit.

In the second operating mode, a second sensor unit for monitoring the change of the adjustment position of the component 40 may be activated. The structure and the function of this second sensor unit will still be explained in more detail in the following in connection with FIG. 2.

Figure 2:
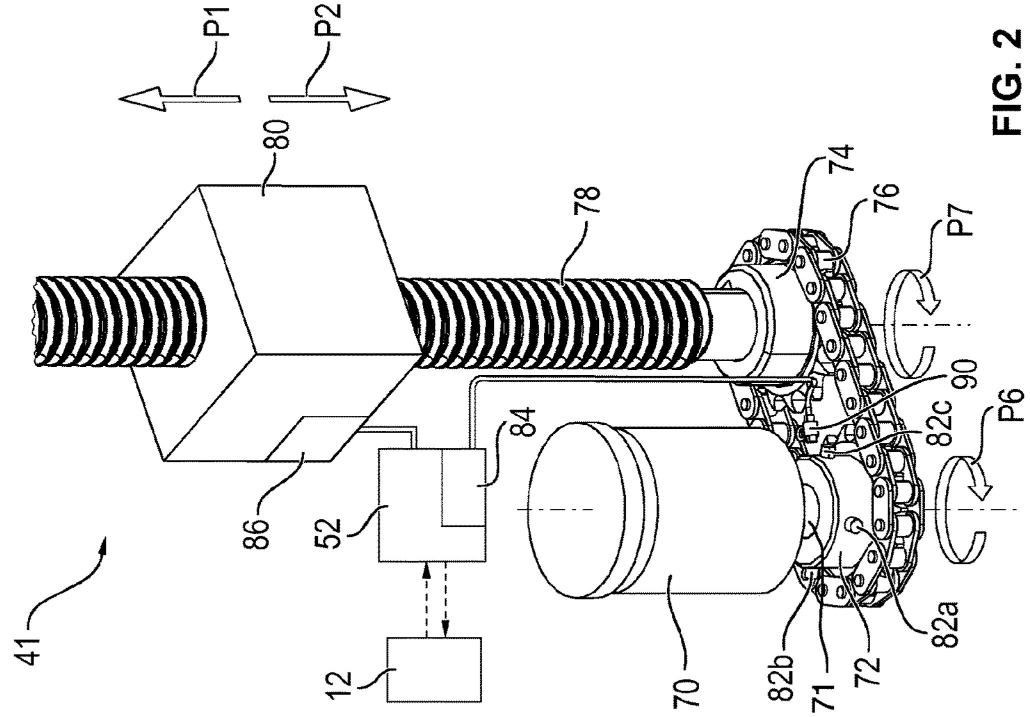
FIG. 2 shows a drive unit having an electric motor and a spindle drive for changing the length of a length-adjustable operating table column of the operating table according to FIGS. 1*a* to 1*c* with an inventive sensor unit for the detection of a rotation of the output shaft of the electric motor when the electric motor is not activated.

FIG. 2 shows a detail of the drive unit 41 for height adjustment of the operating table column 40 of the operating table 30 according to FIGS. 1*a* to 1*c*. The drive unit 41 may comprise an electric motor 70, to the output shaft 71 (or armature shaft) of which a first gearwheel 72 may be connected. Via a chain 76, the driven gearwheel 72 may drive a second gear heel 74 connected to a threaded spindle 78. By a rotation of the threaded spindle 78, a coupling element 80 may be moved upward in the direction of the arrow F1 or, in the case of a reverse direction of rotation, downward in the direction of the arrow P2. Via the coupling element 80, the length of the telescope-like: operating table column 40 may be varied. The detection of the length of the operating table, column 40 or the height of a patient support surface 31 connected to the operating table column 40 may take place via a position sensor unit 86 serving as a sensor unit. The position sensor unit 86 may he connected to the control unit 52 via a signal line. The control unit 52 may evaluate the sensor signals of the position sensor unit 86.

The drive unit 41 may comprise a second sensor unit 90 which is designed as a reed switch 90 and which changes its switching state, e.g. its signal state, dependent on the position of magnets 82*a* to 82*d* (e.g., 82*a*, 82*b*, 82*c*, and 82*d*) arranged along the circumferential surface of a flange of the gearwheel 72 at an angular distance of 90°, a switching state of which may be evaluated by a monitoring circuit 84 of the control unit 52. Upon a rotation of the output shaft of the electric motor 70 in the direction of the arrow P6, a rotation of the threaded shaft 78 in the direction of the arrow P7 may take place so that the magnet 82*d* is arranged opposite to the sensor unit 90, as illustrated in FIG. 3.

Figure 3:
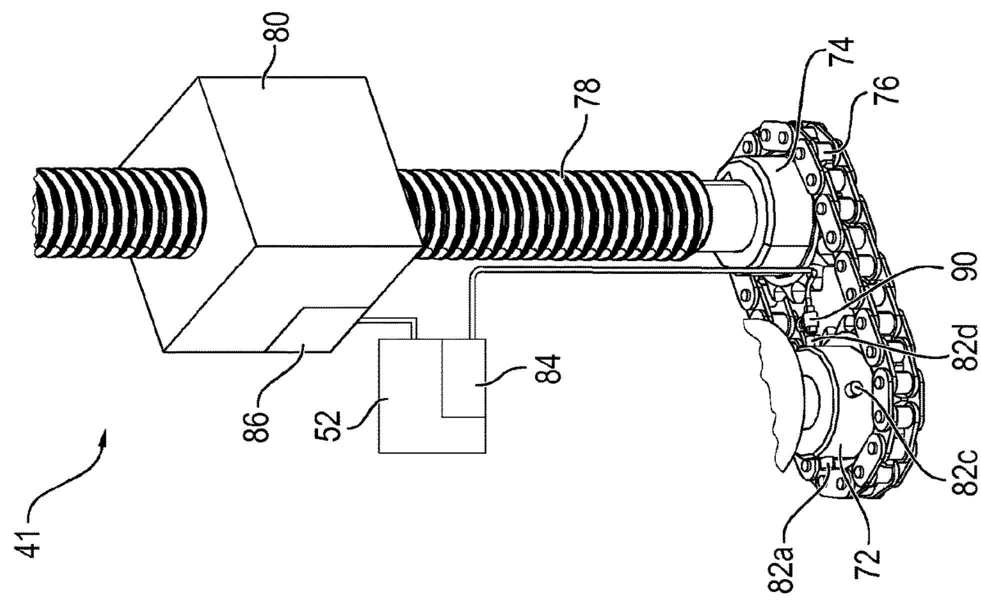
FIG. 3 shows the drive unit according to FIG. 2 after a rotation of the output shaft of the electric motor starting out from the position shown in FIG. 2.

For a clearer illustration, the electric motor 70 has been omitted in FIG. 3. The switching state of the reed switch 90 may be changed upon rotation in the direction of the arrow P6 in the position illustrated in FIG. 3 relative to the position illustrated in FIG. 2. As an alternative to the position sensor unit 86, the first sensor unit can also be designed as an incremental encoder which detects the rotation of the threaded spindle 78.

The position sensor unit 86 may be active in the first operating mode of the control unit 52. In the second operating mode, which may be an energy saver mode of the operating table 30, both the electric motor 70 and the position sensor unit 86 may be deactivated. Further, only the control function of the control circuit 84 of the control unit 52 may be active and may detect a change of the switching state of the reed switch 90 in the second operating mode. Further, the control circuit 84 of the control unit 52 may detect user inputs via the remote control 12, wherein the control circuit 84 may cause a change of the operating mode of the control unit 52 from the second operating mode to the first operating mode when a change of the switching state of the reed switch 90 or a user input via the remote control 12 takes place in the second operating mode. When the operating mode change takes place from the second operating mode to the first operating mode due to the change of the switching state of the reed switch 90, the position sensor unit 86 may be subsequently activated continuously so that an active height control of the patient support surface 31 is accomplished. In the case of a position deviation from a preset position detected by the position sensor unit 86, a position correction may be carried out by a suitable control of the electric motor 70.

The electric motor 70 may comprise a braking unit which, in the de-energized state, may exert a braking force on the output shaft 71 of the electric motor 70 and thus on the output shaft 71 of the electric motor 70. As a result, a change in position of the coupling element 80 may be prevented when the electric motor 70 is deactivated. If this braking unit does not operate properly, the position of the coupling element 80 may, however, change due to the weight of the patient support surface 31 and the patient lying thereon. Such a change in position caused by a defect of the brake is then detected by the reed switch 90 in connection with the magnets 82*a* to 82*d*. In this case, after the expiration of a preset waiting period a switch from the first operating mode to the second operating mode is prevented, so that the position of the coupling element 80 is maintained by the active position monitoring and correction by the position sensor unit 86 in connection with the electric motor 70.

Figure 4:
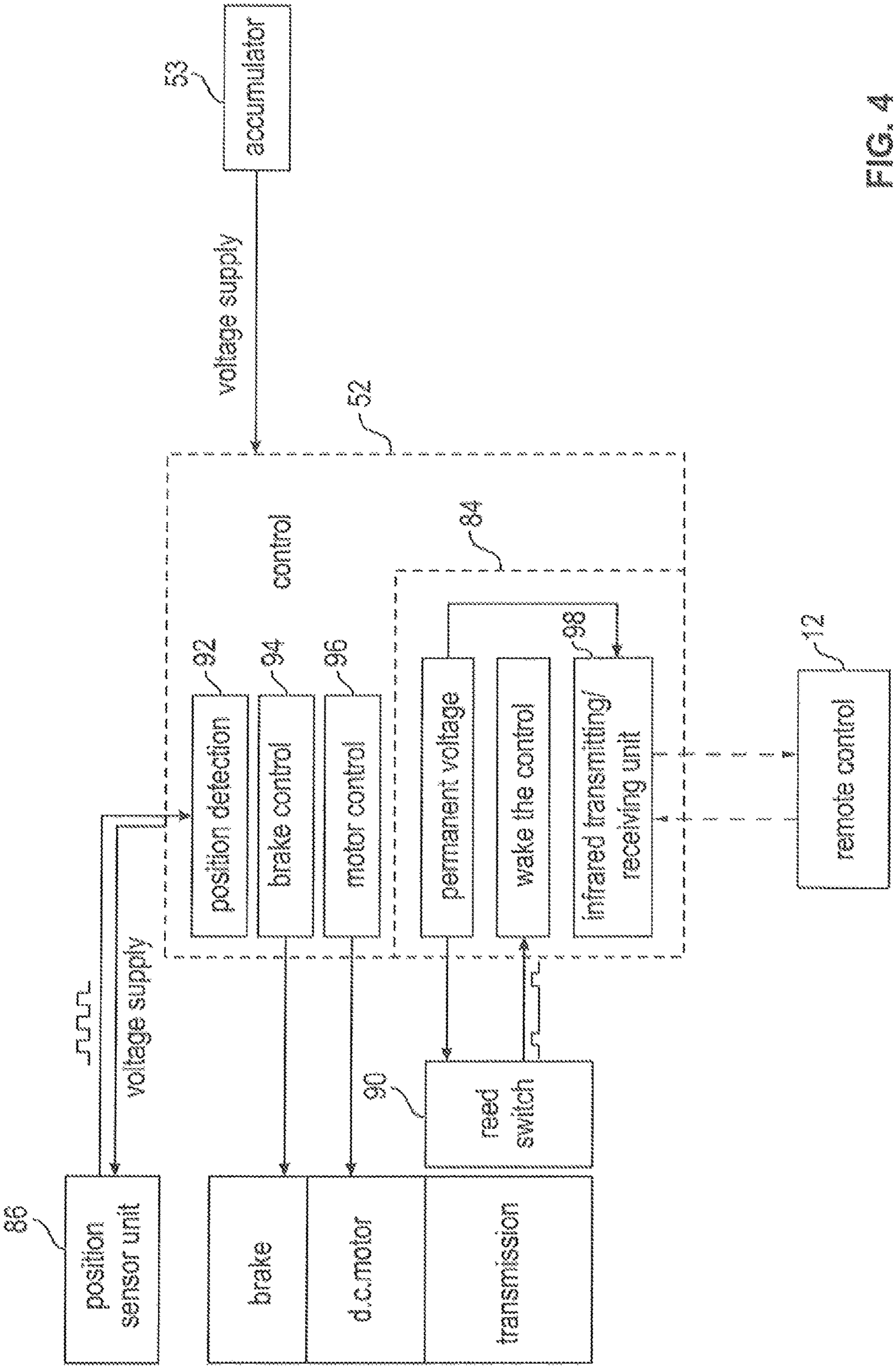
FIG. 4 shows a block diagram for controlling the operating table according to FIGS. 1*a* to 1*c* with the drive unit according to FIG. 2.

In FIG. 4, a block diagram of the drive unit 41 is shown. As illustrated in the block diagram, the voltage supply of the control unit 52 may be provided by the accumulator 53. The control unit 52 may provide the position sensor unit 86 with a supply voltage and may receive as a sensor signal from the position sensor unit 86 e.g. a binary signal, which may be evaluated by the position detection function 92 of the control unit 52. In the case of a desired change in position of the coupling element 80, the brake of the motor 70 may be released by the brake control function 94 and the motor 70 may be controlled by the motor control function 96 so that it causes the desired rotation of the gearwheel 72. The control functions 92 to 96 as well as further control functions may be activated in the first operating mode and deactivated in the second operating mode, e.g. in the energy saver mode. In the second operating mode, the control function 84 of the control unit 52 may be activated via the voltage supply of the accumulator 53 so that the reed switch 90 is supplied with voltage.

When the change of the switching state of the reed switch 90 is detected by the control circuit 84, it causes a change of the operating mode of the control unit 52 from the second operating mode to the first operating mode in which the control functions 92 to 96 are again activated. Further, the control circuit 84 may comprise the evaluation of the signals of a transmitting and/or receiving unit 98 for receiving operating information sent via the remote control 12. When such operating information is received, the operating mode of the control unit 52 may be changed from the second operating mode to the first operating mode likewise by the control function 84.

The change of the operating mode from the first operating mode to the second operating mode may take place when, during a preset period of time, no operating information has been sent from the remote control 12 to the transmitting/receiving unit 98. However, no change from the first operating mode to the second operating mode takes place when, due to a switching state change of the reed switch 90 in the second operating mode, a switch from the second operating mode to the first operating mode has taken place. It is assumed that the drive unit 41 does not operate properly when, in the second operating mode, a change of the switching state of the reed switch 90 is detected. The first operating mode is then maintained to provide for the safe operation of the operating table 30 and the desired performance of a surgical operation associated therewith.

Reed switches 90, which may also be referred to as reed contacts, can be designed as contact tongues melted in a glass tube. These contact tongues can in particular have an iron nickel alloy so that the contact tongues are magnetically actuatable. By arranging the contact tongues in a glass tube, reed switches may be hermetically sealed switches which are actuated by a magnetic field. The contact tongues have e.g. a ferromagnetic material in a partial area. Such reed switches 90 may have a small size compared to conventional contacts and allow fast switching operations. Reed switches 90 can be designed as normally closed contacts, normally open contacts, change-over contacts or change-over switches.

Further, in another exemplary embodiment, the magnet or several magnets 82*a* to 82*d* may be mounted on a structural element that is rotatable about an axis, such as a chain wheel 72, a gearwheel or a shaft, within a drive train of the drive unit 41 of the operating table 30. When the rotatable structural element 72 is moved, the magnet or the magnets 82*a* to 82*d* may be guided past a reed switch 90. The change of the switching state of the reed switch 90 and the change of a signal state of the reed switch 90 caused thereby when the reed switch 90 is supplied with a corresponding voltage can be used as a signal for changing the operating mode from the second operating mode to the first operating mode. When the position of the drive motor 70 is detected e.g. via an incremental encoder in the first operating mode, the arrangement of the reed switch 90 may provide for a rotation of the rotatable structural element 72 to be detected. The mentioned incremental encoders do not provide an absolute position but merely detect relative position changes which can only be evaluated in the case of an activated corresponding control function 92 of the control unit 52. When the control function 92 is deactivated in the second operating mode, (e.g. for some time, to, for example, save energy) and if during this period of time a movement of the drive 41 takes place, then this movement may not be detected by the incremental encoder and may not be evaluated by the control unit 52, respectively. If a change of the operating mode from the second operating mode to the first operating mode takes place due to a switching operation of the reed switch 90, the control unit 52 may be continuously operated in the first operating mode so that further unsuitable operation is prevented.

The possibility of switching the control unit from the first operating mode to the second operating mode for saving energy as described in connection with the Figures, and the monitoring of the position or the change of position of the component in the second operating mode by the second sensor unit has been described in connection with the drive unit 41 for driving the height adjustment of the operating table column 40. In addition, a similar approach can be provided for any other drive unit of the operating table 30, for example drive units for changing the position of the components 32 to 38, 42 to 48.

The invention claimed is:

1. An operating table drive apparatus integral with an operating table, the operating table comprising a column and a patient support surface connected to the column, the patient support surface adapted to tilt with respect to a portion of the column along a first axis of rotation and a second axis of rotation, the second axis of rotation is perpendicular to the first axis of rotation and shares a vertical plane with a longitudinal direction of the patient support surface, the operating table drive apparatus comprising: an adjustable component; a drive device that adjusts the adjustable component; a first sensor that detects a position of the adjustable component; a second sensor that detects the position of the adjustable component; and a controller that controls the drive device, wherein the controller operates in a first operating mode and a second operating mode; wherein in the first operating mode of the controller, the first sensor is activated and the drive device is energized; wherein the controller changes from the first operating mode to the second operating mode when the drive device has not been activated for a predetermined time period; wherein in the second operating mode of the controller, the second sensor is activated and the drive device is de-energized; and wherein the controller changes from the second operating mode to the first operating mode when the second sensor detects a change of the position of the adjustable component caused by a defect in a braking unit of the operating table.

2. The operating table drive apparatus of claim 1, wherein the second operating mode is an energy-saving mode in which the first sensor and at least some of the control functions of the controller are deactivated.

3. The operating table drive apparatus of claim 1, further comprising a control element disposed on a remote control, the control element configured to receive user input that controls the controller.

4. The operating table drive apparatus of claim 3, wherein a user sets a value of the predetermined time period via user input inputted to the remote control.

5. The operating table drive apparatus of claim 1, wherein the predetermined time period is between about one second and about one hour.

6. The operating table drive apparatus of claim 1, wherein after a change from the second operating mode to the first operating mode based on the detection of the change of the position of the adjustable component by the second sensor, the controller remains in the first operating mode even after the drive device has not been activated for a predetermined time period.

7. The operating table drive apparatus of claim 6, wherein the position of the adjustable component is detected and monitored by the second sensor after a change from the second operating mode to the first operating mode based on the detection of the change of the position of the adjustable component by the second sensor in the second operating mode, wherein the controller controls the drive device based on a sensor signal of the first sensor such that a correction of the position of the adjustable component occurs.

8. The operating table drive apparatus of claim 6, wherein:
the drive device is a stepper motor; and
after the change from the second operating mode to the first operating mode based on the detection of the change of the position of the adjustable component by the second sensor, the controller activates a step position of the stepper motor.

9. The operating table drive apparatus of claim 6, wherein:
the drive device is an electric motor; and
after the change from the second operating mode to the first operating mode based on the detection of the change of the position of the adjustable component by the second sensor, the controller short-circuits the windings of the electric motor.

10. The operating table drive apparatus of claim 1, wherein the drive device includes the braking unit, and the braking unit is activated in the second operating mode.

11. The operating table drive apparatus of claim 1, wherein the second sensor is a reed switch.

12. An operating table comprising a column and a patient support surface supported by the column, the patient support surface having a longitudinal axis and is configured to elevate via the column, pivot about the longitudinal axis with respect to the column, and pivot about an axis perpendicular to the longitudinal axis, the operating table further comprising:
an adjustable component;
an electric drive device that adjusts the adjustable component, the electric drive device comprising an electric motor;
a first sensor that detects a position of the adjustable component;
a second sensor that detects the position of the adjustable component; and
a controller that controls the electric drive device,
wherein the controller operates in a first operating mode and a second operating mode;
wherein in the first operating mode of the controller, the first sensor is activated and the electric drive device is energized;
wherein the controller changes from the first operating mode to the second operating mode when the electric drive device is energized but has not been activated for a predetermined time period;
wherein in the second operating mode of the controller, the first sensor is deactivated, the second sensor is activated, and the electric drive device is de-energized;
wherein the controller changes from the second operating mode to the first operating mode when the second sensor detects a change of the position of the adjustable component;
wherein after a change from the second operating mode to the first operating mode based on the detection of the change of the position of the adjustable component by the second sensor, the controller remains in the first operating mode even after the electric drive device has not been activated for a predetermined time period;
wherein after the change from the second operating mode to the first operating mode based on the detection of the change of the position of the adjustable component by the second sensor, the controller short-circuits the windings of the electric motor.

13. The operating table of claim 12, wherein:
the adjustable component is a height adjustable component, a longitudinal tilt adjustable component, or a transverse tilt adjustable component of an operating table column; and
the position of the adjustable component relates to a height of a patient support surface connected to the operating table column, a longitudinal tilt adjustment of the patient support surface, or a transverse tilt adjustment of the patient support surface.

14. The operating table of claim 12, wherein the second sensor is a reed switch that detects a rotation of an armature shaft of the electric motor.

15. The operating table of claim 12, wherein the electric drive device includes a brake that is activated in the second operating mode.

16. The operating table of claim 12, wherein the second sensor is a reed switch that detects a rotation of a component that is engaged with an armature shaft.

17. The operating table of claim 12, wherein:
the operating table is a mobile operating table or a movable operating table; and
a power supply of the electric drive device, the controller, the first sensor, and the second sensor is an accumulator.

18. An operating table, comprising:
an adjustable component;
an electric drive device that adjusts the adjustable component;
a position sensor that detects a position of the adjustable component;
a reed switch that detects the position of the adjustable component; and
a controller that controls the electric drive device,
wherein the controller operates in a first operating mode and a second operating mode;
wherein in the first operating mode of the controller, the position sensor is activated and the electric drive device is energized;
wherein the controller changes from the first operating mode to the second operating mode when the electric drive device is energized but has not been activated for a predetermined time period;
wherein in the second operating mode of the controller, the position sensor is deactivated, the reed switch is activated, and the electric drive device is de-energized;
wherein the controller changes from the second operating mode to the first operating mode when the reed switch detects a change of the position of the adjustable component caused by a defect in at least one additional component of the operating table;
wherein after a change from the second operating mode to the first operating mode based on the detection of the change of the position of the adjustable component by the reed switch, the controller remains in the first operating mode even after the electric drive device has not been activated for a predetermined time period; and
wherein the adjustable component is mounted on a spindle of a telescopic operating table column and varies a length of the telescopic operating table column.

19. The operating table of claim 18, wherein:
the electric drive device is an electric motor;

the reed switch detects a rotation of an armature shaft of the electric motor or a rotation of a component that is engaged with the armature shaft;

the reed switch detects the rotation at least when the armature shaft or the component engaged with the armature shaft rotates by a predetermined angle; and the predetermined angle is between about 45° and about 90°.

20. The operating table of claim 18, wherein the reed switch is a hermetically-sealed switch including ferromagnetic material.

21. The operating table of claim 18, wherein the electric drive device includes a brake that is activated in the second operating mode.

22. An operating table drive apparatus integral with an operating table, the operating table comprising a column and a patient support surface connected to the column, the operating table drive apparatus, comprising:

an adjustable component;

a drive device that adjusts the adjustable component;

a first sensor that detects a position of the adjustable component;

a second sensor that detects the position of the adjustable component; and a controller that controls the drive device, wherein the controller operates in a first operating mode and a second operating mode;

wherein in the first operating mode of the controller, the first sensor is activated and the drive device is energized;

wherein the controller changes from the first operating mode to the second operating mode when the drive device has not been activated for a predetermined time period;

wherein in the second operating mode of the controller, the second sensor is activated and the drive device is de-energized; and wherein the controller changes from the second operating mode to the first operating mode when the second sensor detects a change of the position of the adjustable component;

wherein after a change from the second operating mode to the first operating mode based on the detection of the change of the position of the adjustable component by the second sensor, the controller remains in the first operating mode even after the drive device has not been activated for a predetermined time period; and wherein the position of the adjustable component is detected and monitored by the second sensor after a change from the second operating mode to the first operating mode based on the detection of the change of the position of the adjustable component by the second sensor in the second operating mode, wherein the controller controls the drive device based on the a sensor signal of the first sensor such that a correction of the position of the adjustable component occurs.

23. The operating table of claim 21, wherein the at least one additional component of the operating table is the brake.

* * * * *